(No Model.)
F. WHITE & F. J. MURPHY.
ANIMAL TRAP.
No. 442,845. Patented Dec. 16, 1890.
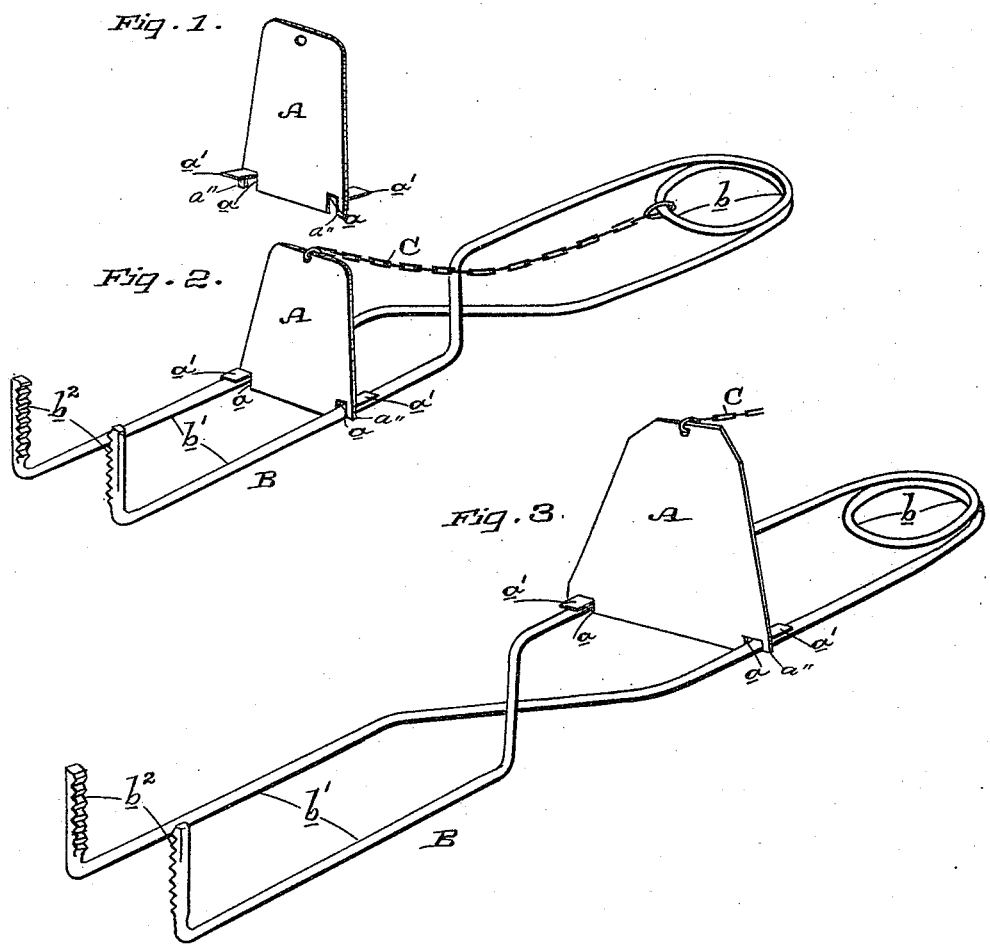
Witnesses,
Geo. H. Strong.
Inventors,
Frank White
Frank J. Murphy
By Dewey & Co.
attys

UNITED STATES PATENT OFFICE.

FRANK WHITE AND FRANK J. MURPHY, OF POMONA, CALIFORNIA.

ANIMAL-TRAP.

SPECIFICATION forming part of Letters Patent No. 442,845, dated December 16, 1890.

Application filed May 19, 1890. Serial No. 352,406. (No model.)

*To all whom it may concern:*

Be it known that we, FRANK WHITE and FRANK J. MURPHY, citizens of the United States, residing at Pomona, Los Angeles county, State of California, have invented an Improvement in Animal-Trap Triggers; and we hereby declare the following to be a full, clear, and exact description of the same.

Our invention relates to triggers for that class of animal-traps in which opposing spring-controlled jaws are held apart by the trigger and fly together when the trigger is tripped; and our invention consists of the improved animal-trap hereinafter fully described and claimed.

The object of our invention is to provide a simple and highly-sensitive trigger for this class of animal-traps.

Referring to the accompanying drawings for a more complete explanation of our invention, Figure 1 is a perspective view of our trigger. Fig. 2 is a view showing its application to a trap. Fig. 3 is a view showing it in a slightly-changed position.

The trigger A is a plate having at its base— one on each side—a notch, which forms an inner and outer shoulder $a$ and $a''$, the latter of which extends downward outside of the stems $b'$ of the trap, while from each notch extends forwardly and rearwardly a flange $a'$.

The animal-trap B is formed of a piece of wire having a spring-coil $b$ at one end, stems or shanks $b'$, and jaws $b^2$. This is a common form of trap, and herein represents any animal-trap of that general class in which the jaws are forced together by a spring of any character, and are to be held open by a trigger.

The trigger A, which may, for convenience, be connected with the trap by a small chain C, is placed in a vertical or upright position, so that its shoulders $a$ and $a''$ pass down between the jaw-stems on their inner and outer sides and hold them separated, while the spring force of the stems holds the trigger upright. In this position the flanges $a'$ lie and rest upon the top of the stems, one extending forwardly and the other backwardly. Now, when the trigger is tilted these flanges, bearing on the stems, act as levers to withdraw the shoulders and trip the trap. The term "stems," as herein used, is meant to refer to the entire length of the wire shank from the spring to the jaws. When the trigger is placed in front of the crossing-point of the stems, as in Fig. 2, the inner shoulders $a$ serve to hold the jaws open; but when it is to be placed behind the crossing-point, as shown in Fig. 3, the shoulders must be changed, the outside shoulders $a''$ in this instance serving to hold the stems together at that point and apart forward of the crossing. Consequently a plate formed, as shown in Fig. 3, with double-opposing shoulders $a$ and $a''$ can be used either in front of or behind the point of crossing.

If, as can be done, the flanges projected in the same direction either forward or back, the tilting of the trigger-plate would have to be in that direction, in order to make the flanges bear down upon the stems; but we prefer to make them extend in opposite directions, so that no matter in which direction the plate be tilted, one or the other flange will effect the disengagement of the shoulders. This trigger can be easily and safely placed, holding well and surely in position, and yet is extremely sensitive to the tilting action.

We are aware that it is not new, broadly, to place a plate between the jaws of animal-traps, and we do not claim such; but

What we claim as new, and desire to secure by Letters Patent, is—

1. A trigger for those animal-traps which have spring-controlled opposing jaws, said trigger consisting of a notched plate having inner and outer shoulders at its base for pressing against the jaw-stems to hold the jaws open, and a flange resting upon top of the stem serving as a lever to disengage the shoulders when the plate is tilted, substantially as herein described.

2. A trigger for those animal-traps which have spring-controlled opposing jaws, said trigger consisting of a plate having notches forming an inner and outer shoulder at opposite sides of its base for pressing against the jaw-stems to hold the jaws open, and a flange at each side resting upon said stems, the flange on one side extending forwardly and that on the other side extending backwardly, said flanges serving as levers to disengage the shoulders when the plate is tilted in either direction, substantially as herein described.

In witness whereof we have hereunto set our hands.

FRANK WHITE.
FRANK J. MURPHY.

Witnesses:
SAML. MCKEE,
IRA F. WHITE.